(No Model.)
G. P. FENNER.
JOURNAL BEARING.
No. 276,015. Patented Apr. 17, 1883.
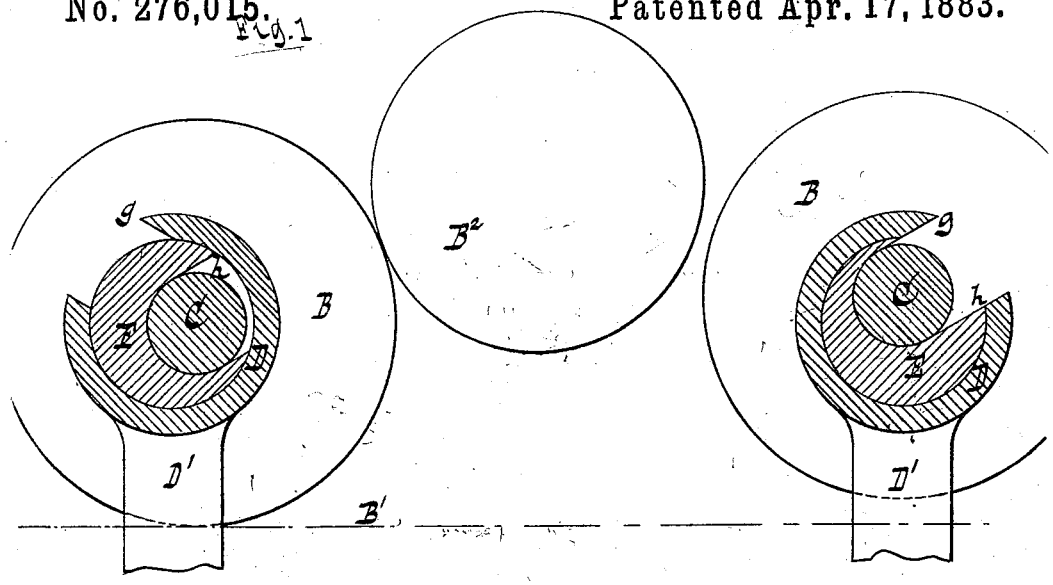
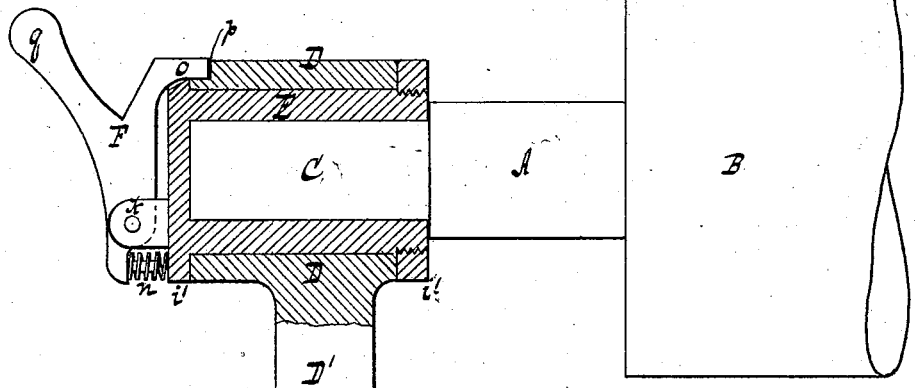
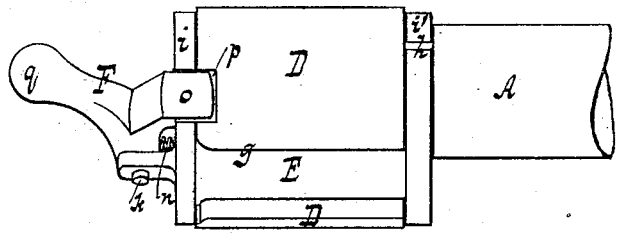
WITNESSES:
Otto Hafeland
William Miller
INVENTOR
George P. Fenner
BY Van Santvoord & Hauff
ATTORNEYS

UNITED STATES PATENT OFFICE.

GEORGE P. FENNER, OF NEW LONDON, CONNECTICUT.

JOURNAL-BEARING.

SPECIFICATION forming part of Letters Patent No. 276,015, dated April 17, 1883.

Application filed March 15, 1883. (No model.)

*To all whom it may concern:*

Be it known that I, GEORGE P. FENNER, a citizen of the United States, residing at New London, in the county of New London and State of Connecticut, have invented new and useful Improvements in Journal-Bearings, of which the following is a specification.

This invention relates to an improvement on the journal-bearing which is described in Letters Patent No. 265,047, granted to me September 26, 1882, and which consists essentially in the combination of a segmental fixed hub and a segmental rotating bushing, said bushing forming the bearing for a shaft.

My present improvement consists in the combination of a segmental fixed hub and a segmental rotating eccentric bushing which form the bearing for a shaft, so that by rotating the bushing the position of the shaft in regard to the center of the fixed hub is changed.

In the accompanying drawings, Figure 1 represents a cross-section. Fig. 2 is a longitudinal section. Fig. 3 is a plan or top view.

Similar letters indicate corresponding parts.

In the drawings, the letter A designates one end of a shaft carrying a roller, B, and having its journal C provided with a bearing in accordance with my invention. This bearing consists of a hub, D, fixed to the upper end of a standard, D', a bushing, E, fitted into a hub to rotate therein, and a locking-latch, F, secured to the bushing. Both the hub and the bushing are of segmental shape, and their openings $g\ h$ are equal in width, respectively, to the diameter of the journal C. The segmental bushing E is provided at its opposite ends with outwardly-projecting flanges $i\ i'$, which hug the ends of the hub D, thus holding the bushing against longitudinal displacement. The latch F is a fixture of the bushing, it being connected thereto by a pivot, $k$. This latch, moreover, is subjected to the action of a spring, $n$, having a tendency to throw its bit or locking end $o$ into engagement with a notch, $p$, in the hub, and it is shaped to form a handle, $q$, which serves not only to adjust the latch, but also to turn the bushing. The outer end of the bushing is preferably closed to afford a substantial support for the latch F, as well as to exclude dust or grit from the journal at that place.

By referring to Fig. 1 of the drawings it will be seen that the inner and outer surfaces of the bushing E are eccentric in relation to each other, so that the thickness of the bushing is different at different places. If the bushing is rotated in the hub D therefore, the position of the shaft A in relation to the center of the hub is changed. By these means I am enabled to throw the roller B, which is mounted on the shaft A, in or out of contact with two other surfaces, B' B², one of which may represent the line of type and the other the ink-distributer in a printing-press. In this case the roller B will be a form-roller. By mounting two such form-rollers on eccentric bearings, as shown in Fig. 1, I am enabled to throw either of said rollers into or out of contact with the distributer B² and the line of type B' simply by turning the eccentric bushing E in the hub D.

I distinctly disclaim in this application for a patent the devices shown and described in my Patent No. 265,047.

What I claim as new, and desire to secure by Letters Patent, is—

The combination, substantially as hereinbefore described, of the segmental fixed hub D and the segmental rotating eccentric bushing E.

In testimony whereof I have hereunto set my hand and seal in the presence of two subscribing witnesses.

GEORGE P. FENNER. [L. S.]

Witnesses:
GEORGE COLFAX,
H. W. HUBBARD.